US009762801B1

(12) United States Patent
Zhu et al.

(10) Patent No.: US 9,762,801 B1
(45) Date of Patent: Sep. 12, 2017

(54) IMAGE PROCESSING CIRCUIT, HAND-HELD ELECTRONIC DEVICE AND METHOD FOR COMPENSATING FOR MOTION IN AN IMAGE RECEIVED BY AN IMAGE SENSOR

(71) Applicant: Motorola Mobility LLC, Chicago, IL (US)

(72) Inventors: Jing-Nan Zhu, Buffalo Grove, IL (US); Daniel Maack Bloom, Loveland, CO (US); Dalong Li, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/064,682

(22) Filed: Mar. 9, 2016

(51) Int. Cl.
H04N 5/232 (2006.01)
(52) U.S. Cl.
CPC ....... H04N 5/2327 (2013.01); H04N 5/23264 (2013.01); H04M 2250/52 (2013.01)
(58) Field of Classification Search
CPC ............. H04N 5/2327; H04N 5/23264; H04N 5/23254; H04M 2250/52
(Continued)

(56) References Cited

U.S. PATENT DOCUMENTS 8,823,809 B1 * 9/2014 Jensen ............... H04N 5/23267
348/208.4
2008/0062285 A1 * 3/2008 Xie ..................... H04N 5/23254
348/240.1

(Continued)

FOREIGN PATENT DOCUMENTS

SG WO 2008136771 A1 * 11/2008 ............... G06T 5/50

OTHER PUBLICATIONS

Sevket Derin Babacan, et al., "Bayesian Blind Deconvolution from Differently Exposed Image Pairs", IEEE Transactions on Image Processing, vol. 19, No. 11, Nov. 2010, pp. 2874-2888.

(Continued)

Primary Examiner — Nhan T Tran
(74) Attorney, Agent, or Firm — Watson Intellectual Property Group

(57) ABSTRACT

The present application provides an image processing circuit, a hand-held electronic device and a method for compensating for motion in an image received by an image sensor. The method includes sub-dividing an array of individual sensor cells from an image sensor adapted for receiving an image into at least a first sub-group and a second sub-group of sensor cells. Multiple timing signals are then generated for use in reading data out of the individual sensor cells of the image sensor. Data values are then read out from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal. The second rate is different than the first rate, where the sensor cells in the second sub-group of sensor cells are sampled more frequently than the sensor cells in the first sub-group of sensor cells. Motion of the image sensor is then determined from the data values read out of the individual sensor cells of the second sub-group of sensor cells. The image derived from the data values read out of the individual sensor cells of the first sub-group of sensor cells is then modified using the motion detected for producing a processed image.

19 Claims, 9 Drawing Sheets

(58) Field of Classification Search
USPC .......................................... 348/208.1, 208.4
See application file for complete search history.

(56) References Cited

U.S. PATENT DOCUMENTS

| | | | |
|---|---|---|---|
| 2008/0100716 A1 | 5/2008 | Fu et al. | |
| 2009/0289169 A1 | 11/2009 | Yang et al. | |
| 2012/0314093 A1* | 12/2012 | Tamayama | G06T 5/003 348/208.1 |
| 2016/0182866 A1* | 6/2016 | Landqvist | H04N 5/232 348/143 |

OTHER PUBLICATIONS

Suk Hwan Lim and Amnon Silverstein, "Estimation and Removal of Motion Blur by Capturing Two Images with Different Exposures", HP Laboratories, Oct. 21, 2008, 8 pages.
Michal Sorel, et al., "Recent Advances in Space-Variant Deblurring and Image Stabilization", 2009, pp. 259-272.
M. Tallon, et al., "Combining Observation Models in Dual Exposure Problems Using the Kullback-Leibler Divergence", 18th European Signal Processing Conference, Aug. 23-27, 2010, pp. 323-327.
Miguel Tallon, et al., "Space-Variant Kernel Deconvolution for Dual Exposure Problem", 19th European Signal Processing Conference, Aug. 29-Sep. 2, 2011, pp. 1678-1682.
Marius Tico and Kari Pulli, "Image Enhancement Method Via Blur and Noisy Image Fusion", IEEE, Nov. 7-10, 2009, 4 pages.
Lu Yuan, et al., "Image Deblurring with Blurred/Noisy Image Pairs", ACM Transactions on Graphics, vol. 26, (3), Jul. 2007, 10 pages.
Atsushi Ito, et al., "BlurBurst: Removing Blur Due to Camera Shake Using Multiple Images", ACM Transactios on Graphics, http://dsp.rice.edu/sites/dsp.rice.edu/files/publications/journal-article/9999/blurbursttoglowres.pdf, Jul. 11, 2013, 15 pages.
Omnivision, "OV16860 16MP Product Brief", http://www.ovt.com/products/sensor.php?id=167, Version 1.1, Oct. 2015, 2 pages.

* cited by examiner

IMAGE PROCESSING CIRCUIT, HAND-HELD ELECTRONIC DEVICE AND METHOD FOR COMPENSATING FOR MOTION IN AN IMAGE RECEIVED BY AN IMAGE SENSOR

FIELD OF THE APPLICATION

The present disclosure relates generally to image processing circuits, and more particularly, to image processing circuits for compensating for motion in an image received by an image sensor.

BACKGROUND

Capturing satisfactory images can sometimes be a challenge under low light conditions and/or instances where high dynamic range imaging is desired. Some people will attempt to address the low light condition/high dynamic range imaging by managing the exposure time, whereby extending the exposure time can allow more light relative to the image to ultimately be captured. However motion including motion of the image capture circuitry, as well as motion within the image can be more pronounced as the exposure time is extended. Motion of the image capture circuitry can also be more pronounced in instances where the image capture circuitry is incorporated as part of a hand-held device, where the hand, which is holding the device during image capture, will often have some degree of movement (i.e. jitter) that can have an effect during a time period of image capture that has been extended to allow for the capture of more light. While increasing the exposure time can have an adverse effect on image blurring, decreasing the exposure time in low light conditions can in at least some instances result in images that are dark and noisy.

Various post image capture processing has been used to try and alleviate the undesirable aspects associated with adjusting the exposure time. In at least some instances, the results of the processing can be enhanced with a good understanding of the motion that has occurred during the exposure time associated with the image that has been captured. In some instances, motion of the image capture circuitry can be determined through the use of a separate sensor, such as a gyroscope. However, it can sometimes be difficult to synchronize the gyroscope sensor data with the time period during which the image is being captured, and/or image data is being read out of the sensor cells of an image sensor. In other instances, a corresponding motion may be derived through an analysis of the image being captured including a sequence of images. However, finding feature points within an image that can be used to track motion can sometimes be difficult. Furthermore, tracking motion via feature points can also be complicated by the fact that the feature point may be a victim of the same blurring due to motion that is affecting the overall image.

The present inventors have recognized that, the determination of a motion estimate can be improved if one or more portions of the image sensor could be configured to be sampled at a higher rate, while the remaining portion of the image sensor could be configured to be sampled at the relatively lower rate to improve aspects of the image quality during low light conditions. The determined motion estimate could then be used to address aspects of the image quality that might be negatively affected by a lower sampling rate and/or a longer exposure period, such as concerns with blurring and/or noise.

SUMMARY

The present application provides an image processing circuit. The image processing circuit includes an image sensor adapted for receiving an image. The image sensor includes an array of individual sensor cells, the array including a plurality of sensor cells divided into at least a first sub-group and a second sub-group, where each sub-group includes a different plurality of sensor cells. The image processing circuit further includes a controller coupled to the image sensor. The controller includes a timing signal generator module adapted for generating multiple timing signals for use in reading data out of the individual sensor cells of the image sensor. The controller further includes an image sensor interface module coupled to the timing signal generator module for receiving timing signals used in reading out data values from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal. The second rate is different than the first rate, where the sensor cells in the second sub-group of sensor cells are sampled more frequently than the sensor cells in the first sub-group of sensor cells. The controller still further includes a motion detection module adapted for determining motion of the image sensor from the data values read out of the individual sensor cells of the second sub-group of sensor cells. Further yet, the controller includes an image modifying module adapted for modifying the image derived from the data values read out of the individual sensor cells of the first sub-group of sensor cells using the motion detected by the motion detection module for producing a processed image.

In at least one embodiment, the motion detection module uses non-adjacent points along the determined motion to determine a localized motion, which coincides with when the data is read out of a respective portion of the first sub-group of sensor cells for use with modifying by the image modifying module of a respective portion of the image associated with data from the respective portion of the first sub-group of sensor cells.

The present application further provides a method for compensating for motion in an image received by an image sensor. The method includes sub-dividing an array of individual sensor cells from an image sensor adapted for receiving an image into at least a first sub-group and a second sub-group of sensor cells. Multiple timing signals are then generated for use in reading data out of the individual sensor cells of the image sensor. Data values are then read out from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal. The second rate is different than the first rate, where the sensor cells in the second sub-group of sensor cells are sampled more frequently than the sensor cells in the first sub-group of sensor cells. Motion of the image sensor is then determined from the data values read out of the individual sensor cells of the second sub-group of sensor cells. The image derived from the data values read out of the individual sensor cells of the first sub-group of sensor cells is then modified using the motion detected for producing a processed image.

The present application still further provides a hand-held electronic device. The hand-held electronic device includes a housing, which is adapted for being held by the hand of the user. The hand-held electronic device further includes an image sensor, which is coupled to the housing including being at least one of located on or located within the housing. The image sensor includes an array of individual sensor cells, the array including a plurality of sensor cells divided into at least a first sub-group and a second sub-group, where each sub-group includes a different plurality of sensor cells. The hand-held electronic device further includes a controller coupled to the image sensor. The controller includes a timing signal generator module adapted for generating multiple timing signals for use in reading data out of the individual sensor cells of the image sensor. The controller further includes an image sensor interface module coupled to the timing signal generator module for receiving timing signals used in reading out data values from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal. The second rate is different than the first rate, where the sensor cells in the second sub-group of sensor cells are sampled more frequently than the sensor cells in the first sub-group of sensor cells. The controller still further includes a motion detection module adapted for determining motion of the image sensor from the data values read out of the individual sensor cells of the second sub-group of sensor cells. Further yet, the controller includes an image modifying module adapted for modifying the image derived from the data values read out of the individual sensor cells of the first sub-group of sensor cells using the motion detected by the motion detection module for producing a processed image.

These and other features, and advantages of the present disclosure are evident from the following description of one or more preferred embodiments, with reference to the accompanying drawings.

DETAILED DESCRIPTION OF THE PREFERRED EMBODIMENT(S)

Figure 2:
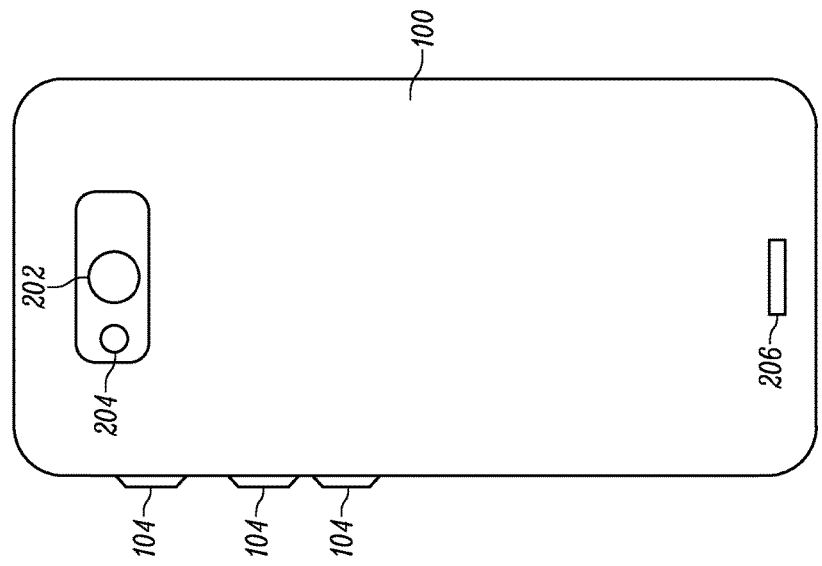
FIG. 2 is a back view of an exemplary hand-held electronic device.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

Figure 1:
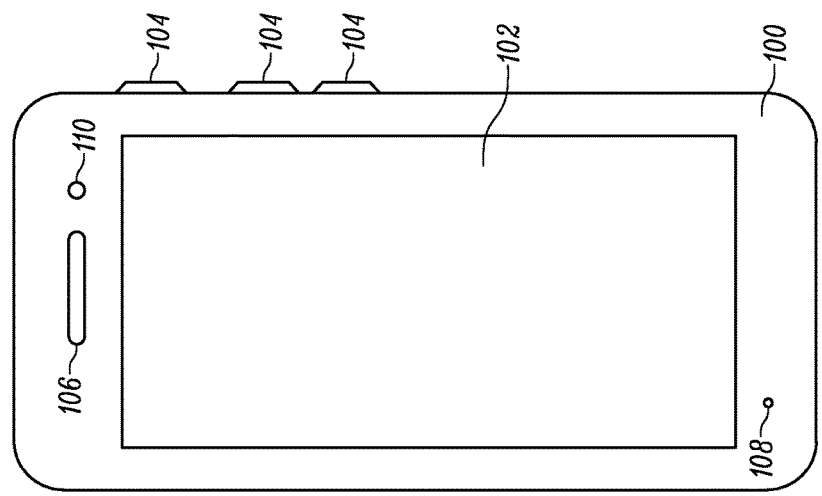
FIG. 1 is a front view of an exemplary hand-held electronic device.

FIG. 1 illustrates a front view of an exemplary hand-held electronic device 100. While in the illustrated embodiment, the type of hand-held electronic device shown is a radio frequency cellular telephone, which incorporates an image capture capability, such as a camera function, other types of devices that incorporate image capture capabilities are also relevant to the present application. In other words, the present application is generally applicable to hand-held electronic devices beyond the type being specifically shown. A couple of additional examples of suitable hand-held electronic devices that may additionally be relevant to the present application in the incorporation and management of image capture capabilities and image processing circuitry in a hand-held electronic device can include a tablet, a gaming device, a personal digital assistant, a dedicated camera, as well as any other form of hand-held electronic device that one might at least sometimes carry around on one's person for which it might be desirable to capture an image.

In the illustrated embodiment, the radio frequency cellular telephone includes a display 102 which covers a large portion of the front facing. In at least some instances, the display can incorporate a touch sensitive matrix, that facilitates detection of one or more user inputs relative to at least some portions of the display, including interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for actuation. In addition to one or more virtual user actuatable buttons or keys, the device 100 can include one or more physical user actuatable buttons 104. In the particular embodiment illustrated, the device has three such buttons located along the right side of the device.

The exemplary hand-held electronic device, illustrated in FIG. 1, additionally includes a speaker 106 and a microphone 108 in support of voice communications. The speaker 106 may additionally support the reproduction of an audio signal, which could be a stand-alone signal, such as for use in the playing of music, or can be part of a multimedia presentation, such as for use in the playing of a movie, which might have at least an audio as well as a visual component. The speaker 106 may also include the capability to also produce a vibratory effect. However, in some instances, the purposeful production of vibrational effects may be associated with a separate element, not shown, which is internal to the device. Generally, the speaker 106 is located toward the top of the device, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. Also located near the top of the device, in the illustrated embodiment, is a front facing camera 110.

FIG. 2 illustrates a back view of the exemplary hand-held electronic device 100, illustrated in FIG. 1. In the back view of the exemplary hand-held electronic device, the three physical user actuatable buttons 104, which are visible in the front view, can similarly be seen. The exemplary hand-held electronic device 100 additionally includes a back side facing camera 202 with a flash 204, as well as a serial bus port 206, which is generally adapted for receiving a cable connection, and which can be used to receive data and/or power signals. The circular openings identified as cameras 110 and 202 are commonly associated with an aperture that can be selectively controlled to let light be received by the circuitry of the camera within the internal structure of the camera, often times through one or more lenses, so as to be received by an image sensor comprised of an array of image sensor cells.

While being held by a hand of the user, any motion of the user's hand, sometimes referred to as hand jitter, will often translate to a corresponding movement of the device. In some instances, the motion can affect at least some operations of the device including the capture of an image by the camera. More specifically, the motion of the user's hand can cause at least portions of the view being captured by any associated camera circuitry to laterally shift relative to individual sensor cells that form all or parts of the camera's image sensor. In addition to hand jitter, the device, as noted above, may include the purposeful generation of vibratory effects. If such effects were to occur during the capture of an image, the vibratory effects could additionally contribute to a movement of the device that might also produce unwanted effects in an image being captured by an image sensor.

Figure 3:
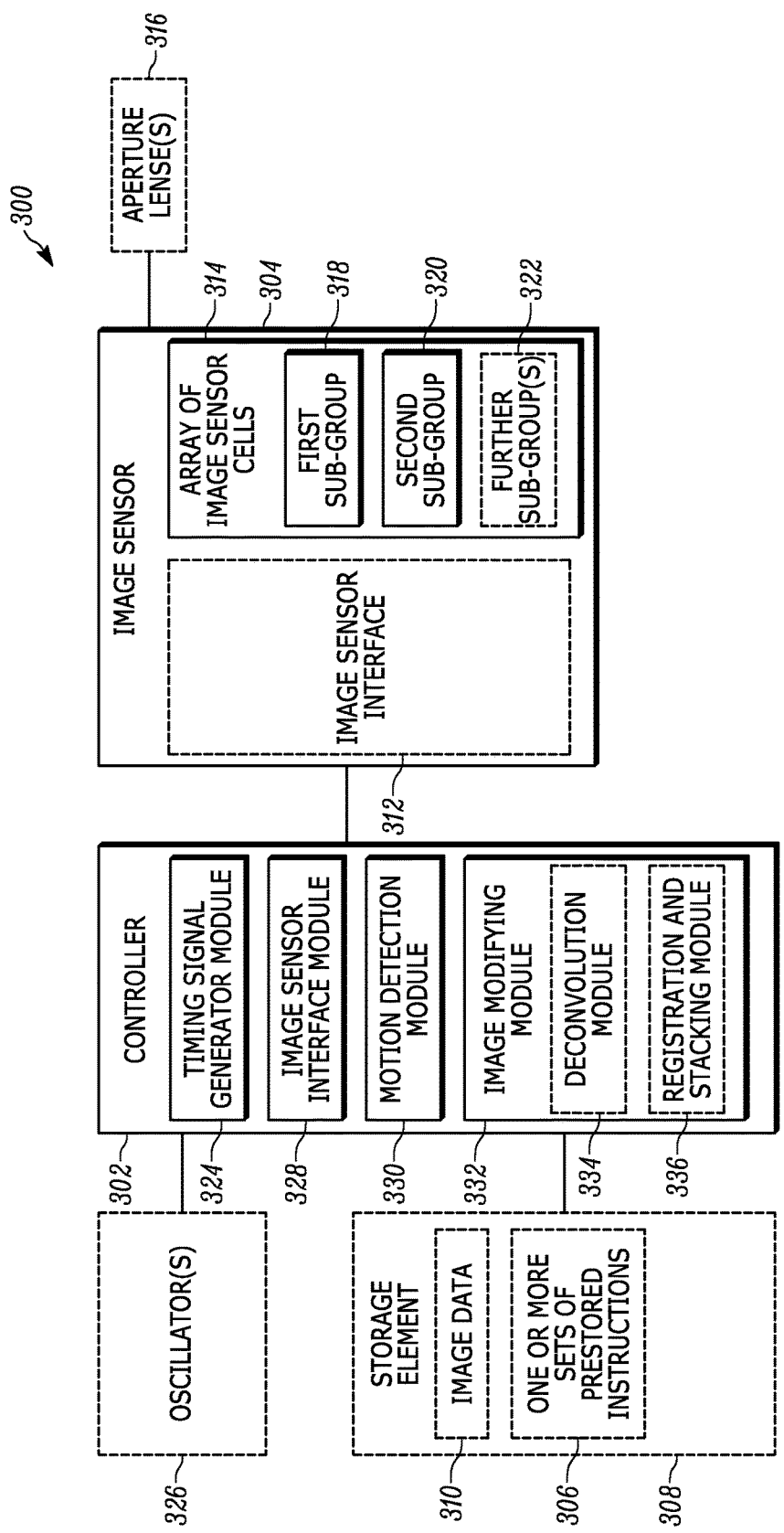
FIG. 3 is a block diagram of an exemplary image processing circuit.

FIG. 3 illustrates a block diagram of an exemplary image processing circuit 300, in accordance with at least one embodiment. In the illustrated embodiment, the control circuitry 300 includes an image sensor 304, and a controller 302, which is adapted for managing at least some of the operation of the image processing circuit 300. In some embodiments, the controller 302 could be implemented in the form of one or more processors, which are adapted to execute one or more sets of pre-stored instructions 306, which may be used to form or implement the operation of at least part of one or more controller modules including those used to compensate for motion in an image received by an image sensor 304. The one or more sets of pre-stored instructions 306 may be stored in a storage element 308, which while shown as being separate from and coupled to the controller 302, may additionally or alternatively include some data storage capability for storing at least some of the prestored instructions 306 for use with the controller 302, that is integrated as part of the controller 302.

The storage element 308 could additionally and/or alternatively be used to store image data 310. However, the image data 310 could additionally and/or alternatively be included as part of a storage element that in addition to potentially being included as part of the processor 302 could also be integrated as part of the image sensor 304.

The storage element 308 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory stick. One skilled in the art will still further appreciate that still other further forms of storage elements could be used without departing from the teachings of the present disclosure. In the same or other instances, the controller 302 may additionally or alternatively incorporate state machines and/or logic circuitry, which can be used to implement at least partially, some of the modules and/or functionality associated with the controller 302.

The image sensor 304 will generally include an array of individual image sensor cells 314. Each of the individual image sensor cells 314 will detect an amount of light relative to a particular spatial arrangement within the array of image sensor cells 314 at which the light is received. Generally, the individual image sensor cells 314 are arranged to account for the light received within a bounded area associated an image being captured. The individual sensor cells of the array 314 are divided into at least a first sub-group 318, and a second sub-group 320. Division into further sub-group(s) 322 is also possible. Generally each individual sensor cell of the array 314 is associated with a particular one of the of the sub-groups.

The light can be received by the array of image sensor cells 314 through an aperture and/or one or more lenses 316. An aperture can be used to limit the light collection by the image sensor 304 to a particular time interval. One or more lenses can be used to adjust the light path, prior to the light being received by the array of image sensor cells 314. In other words, the one or more lenses can be used to impact the different portions of the array upon which light from the image to be captured is received.

The controller 302, in at least some instances, can be coupled to the image sensor 304 via a portion of the image sensor 304 identified as an image sensor interface 312. In some instances, the image sensor interface 312 can include signal amplification circuitry, conversion circuitry for translating between analog and digital forms of data, as well as a data buffer which can be used to temporarily store data being read out of the image sensor.

In the present embodiment, the controller includes a timing signal generator module 324, which is adapted for generating multiple timing signals for use in reading data out of the individual sensor cells. The controller generally uses a different timing signal for reading data out of each of the respective sub-groups of image sensor cells. In at least some instances, the controller 302 makes use of one or more oscillator(s) 326 as part of generating the various timing signals.

The controller 302 further includes an image sensor interface module 328. The image sensor interface module 328 facilitates use of the respective timing signals in reading data out of each of the sub-groups of sensor cells. For example, the data values from the individual sensor cells of the first sub-group of sensor cells 318 are read out at a first rate using a first timing signal, and the data values from the individual sensor cells of the second sub-group of sensor cells 320 are read out at a second rate using a second timing signal, where the second rate is different than the first rate, and the data from the sensor cells in the second sub-group 320 are read out or sampled more frequently than the data from the sensor cells in the first sub-group 318.

The controller 302 still further includes a motion detection module 330 adapted for determining motion of the image sensor from the data values read out of the individual sensor cells of the second sub-group of sensor cells. For example, the motion could be the result of movement of the device within which the image sensor 304 is located, such as a hand-held electronic device. In other instances, the detected motion may be the result of an element moving within the image being captured. However, in such an instance, the detected motion may be limited to a particular portion of the image for purposes of being used in subsequent processing of the image data. In at least some instances, the motion is determined by tracking one or more feature points in a sequence of readings of data values from the second more frequently sampled sub-group of sensor cells 320. From this motion, a movement path can be determined that is sometimes referred to as a point spread function.

Further yet, the controller 302 includes an image modifying module 332. The image modifying module 332 is adapted for modifying the image derived from the data values read out of the individual sensor cells of the first sub-group of sensor cells 318 using the motion detected by the motion detection module 330 for producing a processed image. For example, once the motion is detected, the detected motion can be used by a deconvolution module 334 to de-blur at least portions of the image derived from the data values read out of the individual sensor cells for producing a processed image. As a further example, once the motion is detected, the detected motion can be used by a registration and stacking module 336 to de-noise at least portions of the image derived from the data values read out of the individual sensor cells for producing a processed image. The registration and stacking module 336 uses a sequence of collected images, and respectively shifts each of the collected images in an attempt to counteract the movement between images from any detected motion before the images are effectively combined as part of a stacking of the images.

In some instances the controller 302 and storage element 308 could be part of circuitry that could additionally be used to support other functions within a device. It is also possible that the controller 302 and/or storage element 308 are dedicated for use with the image processing circuit 300.

In at least some instances, the de-blurring associated with the deconvolution module 334 may be applied to the image data associated with the first sub-group of sensor cells 318, and the de-noising associated with the registration and stacking module 336 may be applied to the image data associated with the second sub-group of sensor cells 320.

Figure 4:
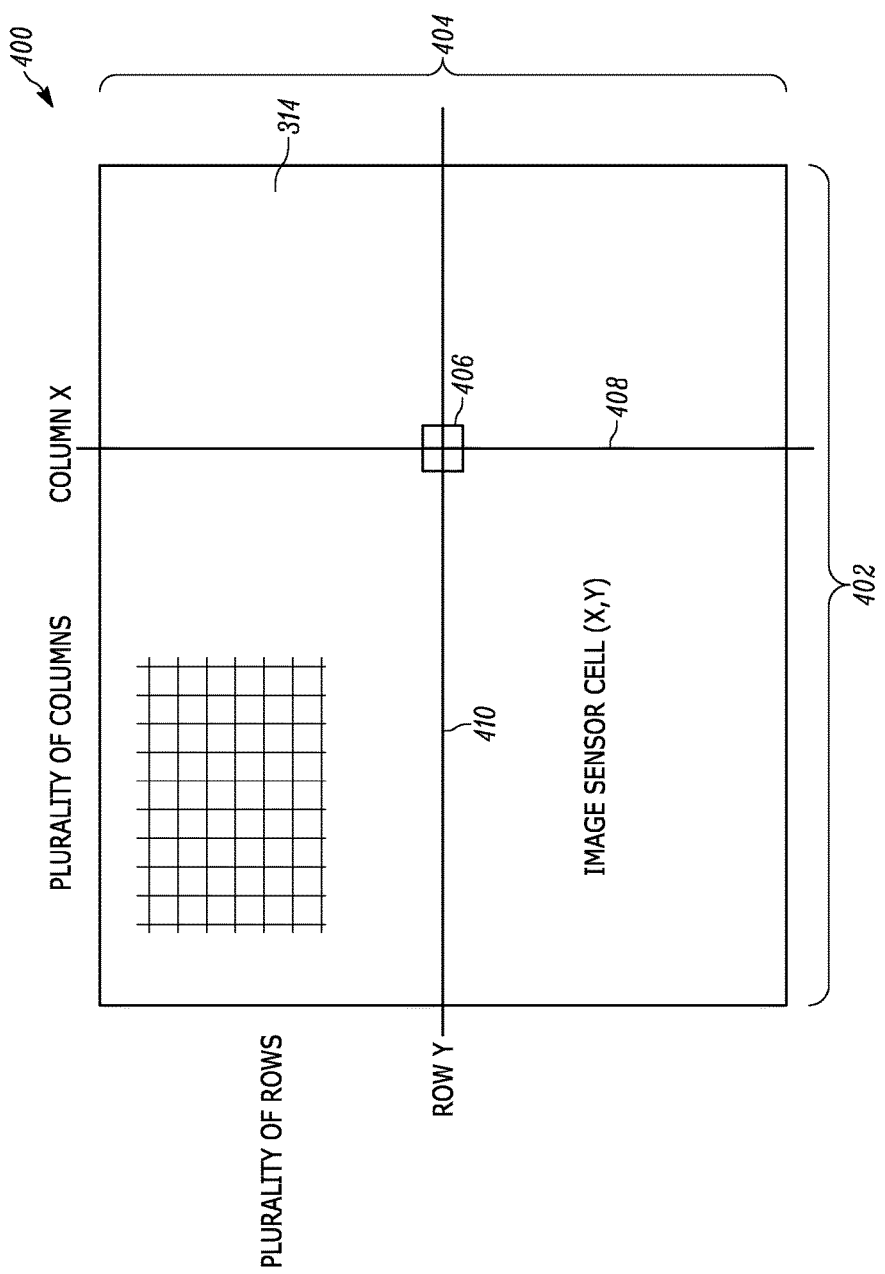
FIG. 4 is a view of an exemplary arrangement of an array of individual sensor cells.

FIG. 4 illustrates a view of an exemplary arrangement 400 of an array 314 of individual sensor cells. In the illustrated embodiment, the individual sensor cells are arranged in a two dimensional grid pattern including a plurality of columns 402 and a plurality of rows 404, where any one individual sensor cell can be identified by the particular column and row within which it is located. For example, the illustrated image sensor cell 406, is located in column x 408, and row y 410. In this way, the location of each of the sensor cells can be identified, spatially, by its respective position within the grid pattern. Each individual sensor cell is adapted to detect an amount and correspondingly potentially a type of light that is received at each location within the grid. The array commonly includes a sensor cell at each of the intersections of interest, but a sensor cell at each intersection is not a requirement.

In at least some instances, it might be possible for each sensor cell to include a sensor for detecting each one of a plurality of different wavelength components. For example, a sensor in each of the sensor cells could detect a respective one of red, green and blue, so as to allow an amount of each of the color components to be detected and read out at any particular location. In some instances a sensor cell may include a fourth sensor in addition to red, green and blue, namely clear, for detecting an overall aggregate amount of light regardless of type, corresponding to an overall light intensity detected at a particular location. In at least some instances, an array is arranged with a particular finite number of columns and a particular finite number of rows. Many sensors, today, have a number of columns in the thousands, as well as a number of rows in the thousands. Often times, there is an ordered manner in which the data is read out of the array 314 of sensor cells. For example, the image sensor may be arranged to allow data to be read out in rows, which may influence how one wants to divide each of the plurality of sensor cells into first and second sub-groups.

Figure 5:
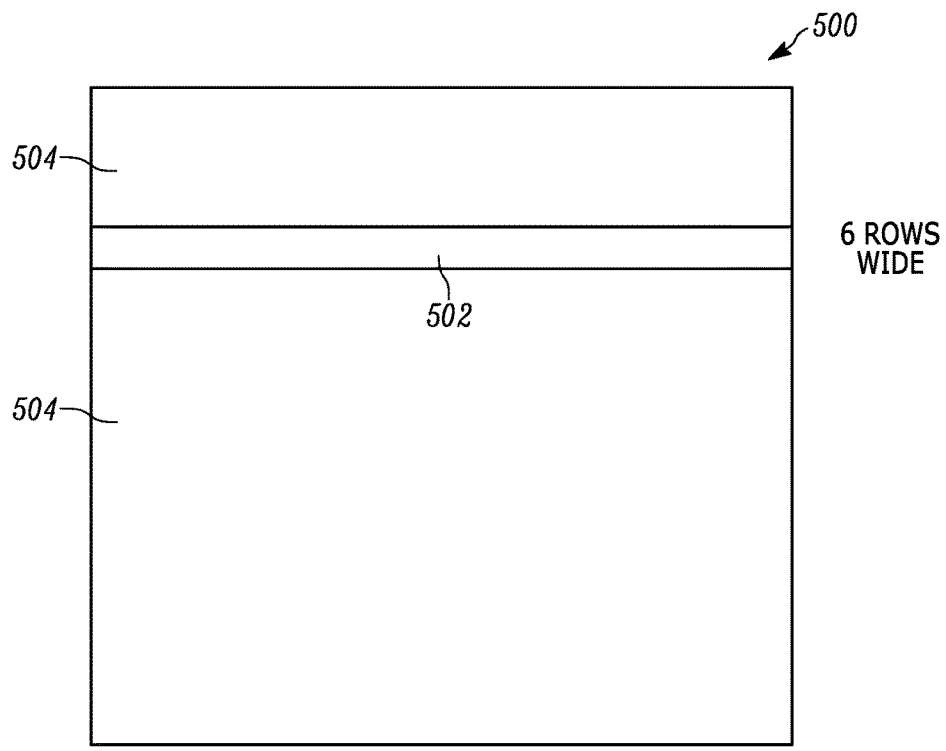
FIG. 5 is a view of an array of individual sensor cells divided into at least a first sub-group and a second sub-group, where each sub-group includes a different plurality of sensor cells.

FIG. 5 illustrates a view 500 of an array 314 of individual sensor cells divided into at least a first sub-group 318 and a second sub-group 320, where each sub-group includes a different plurality of sensor cells. For example, in the illustrated embodiment, a second sub-group includes six adjacent rows 502, with the remaining rows 504 being a part of the first sub-group. While each sub-group is shown as including cells that extend the full width of the image sensor, it is possible that in some arrangements a particular sub-group might include less than all of the sensors in a particular row. However, depending upon how the data stored in the sensor cell may be accessed, it may make it easier to associate all of the sensor cells of a particular row in the same particular sub-group.

Figure 6:
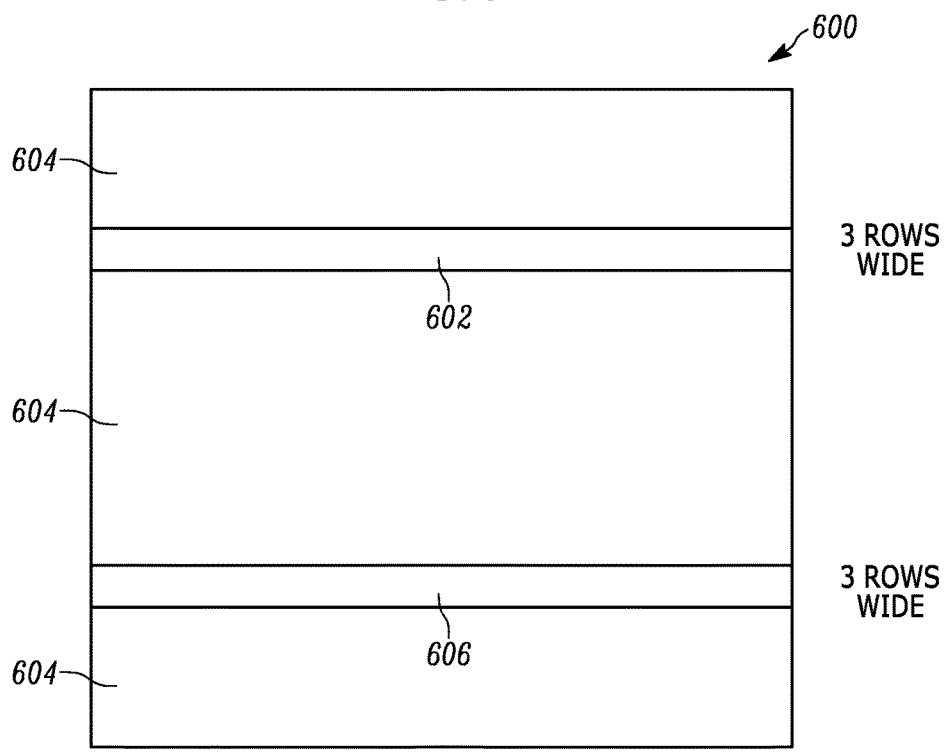
FIG. 6 is a view of an array of individual sensor cells divided into at least a first sub-group, a second sub-group, and a third sub-group, where each sub-group includes a different plurality of sensor cells.

FIG. 6 illustrates a view 600 of an array 314 of individual sensor cells divided into at least a first sub-group 604, a second sub-group 602, and a third sub-group 606, where each sub-group includes a different plurality of sensor cells. In the illustrated embodiment, each of the second and third sub-groups includes three rows. While a particular arrangement has been illustrated in each of FIGS. 5 and 6, one skilled in the art will recognize that the size, shape, and location of each sub-group within the array of sensors might differ without departing from the teachings of the present application. However, there is a benefit to defining a second (or third) sub-group where the included sensor cells are arranged in a sequence in one or more of the rows and columns. In at least some instances, the second sub-group (and sometimes additional sub-groups) will be used to track a detected motion. By including multiple adjacent sensor cells within a particular row, in at least some instances, it may be easier to track motion along the row by detecting the position of a particular identifiable feature in the data values sequentially read out of the particular sensors. By including multiple adjacent cells within a particular column across adjacent rows, one can more readily track movement across multiple rows. The use of multiple sub-groups for tracking motion can allow multiple localized motion vectors to be determined, each being associated with the position within the array of sensor cells where the sensor cells associated with a particular sub-group are located.

Figure 7:
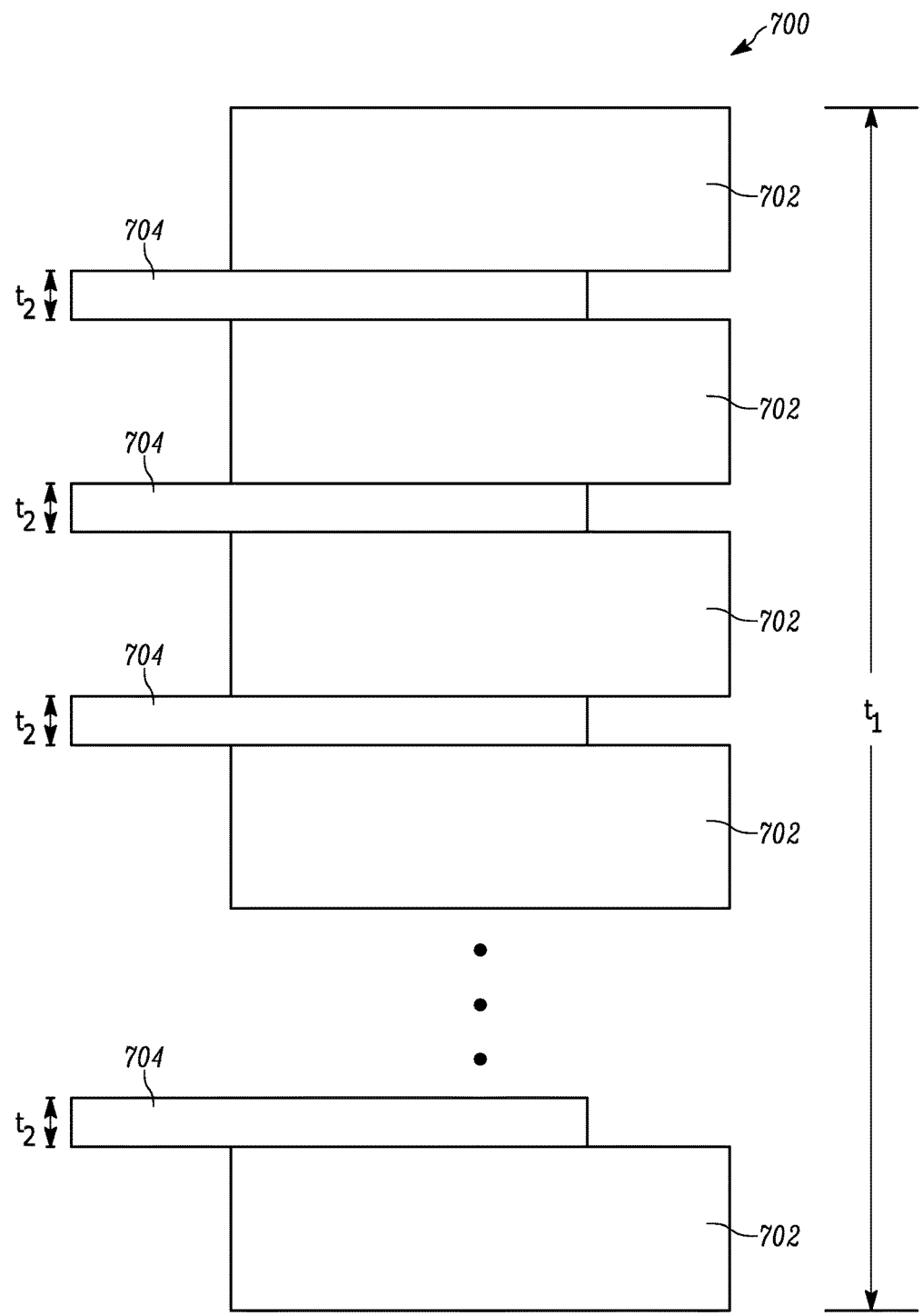
FIG. 7 is a timing diagram illustrating an exemplary order, in which the data is read out of the sensor cells within the array.

FIG. 7 illustrates a timing diagram 700 illustrating an exemplary order, in which the data is read out of the sensor cells within the array. Where it is desirable to read out data from at least one of the sensor sub-groups more frequently, it may be possible to interrupt the reading of data from one of the sub-groups to read data from a different sub-group. In the illustrated embodiment, the larger blocks 702 represent the time devoted to reading data values for a first sub-group, and the smaller blocks 704 represent the time devoted to reading data values for a second sub-group. Because one sub-group, such as the first sub-group may have thousands of related rows, and the second sub-group may have a relatively smaller number of rows, it may require multiple time periods associated with the multiple larger blocks 702 (t1) to complete the accessing of all of the data associated with the larger number of rows of the first sub-group, whereas it may be possible to access all of the data associated with the second sub-group associated with a smaller number of rows during the time (t2) associated with each of the smaller blocks 704. This allows the data associated with the second sub-group of sensor cells to be accessed with a greater frequency.

Figure 8:
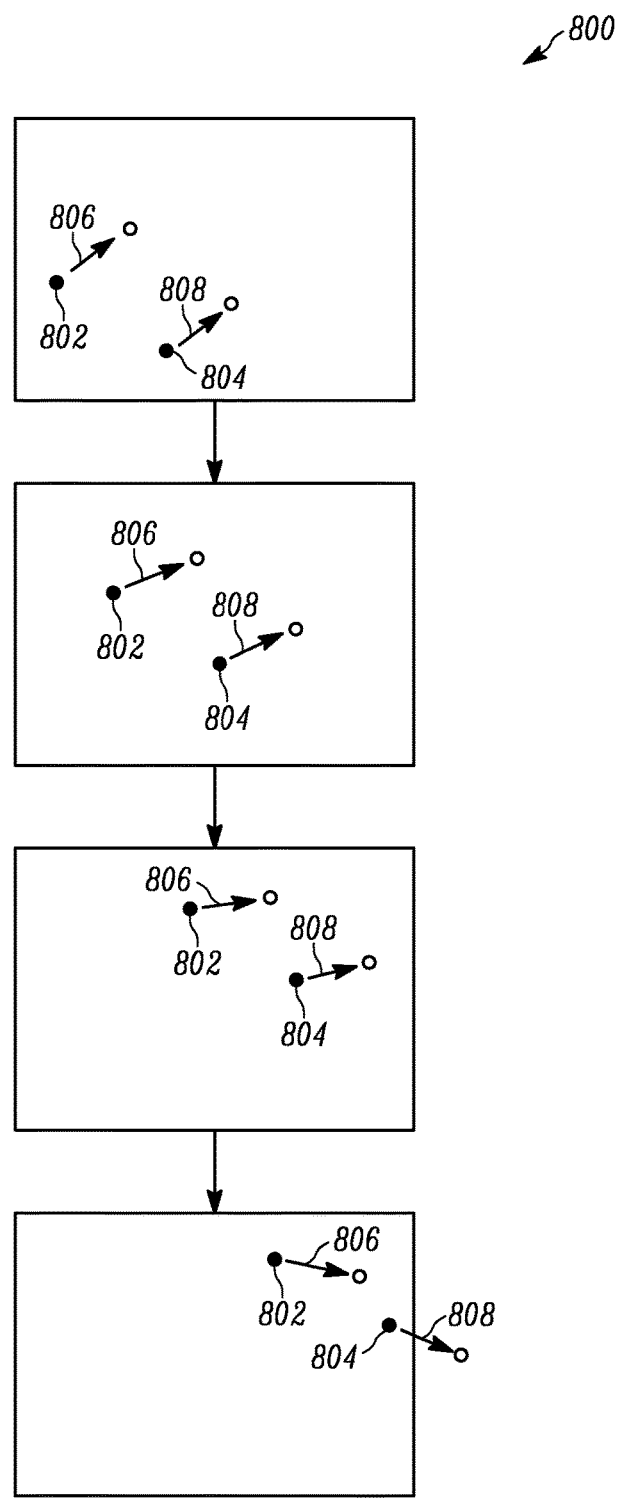
FIG. 8 is a sequential view of the tracking of a pair of feature points for determining a motion during the sequential reading of data from a preselected sub-group of sensor cells.

FIG. 8 illustrates a sequential view 800 of the tracking of a pair of feature points 802 and 804 for determining a motion 806 and 808 during the sequential reading of data from a preselected sub-group of sensor cells. In the sequence of views, the solid dot represents the current location of a particular feature point, and the open dot represents the superimposed location of the particular feature point in the next image from which an estimate of motion 806 and 808 can be determined during the time periods in which the sensors associated with the second (or third) sub-group were sampled. By combining the determined motion vectors, an overall motion, (i.e. a point spread function), can be estimated.

Figure 9:
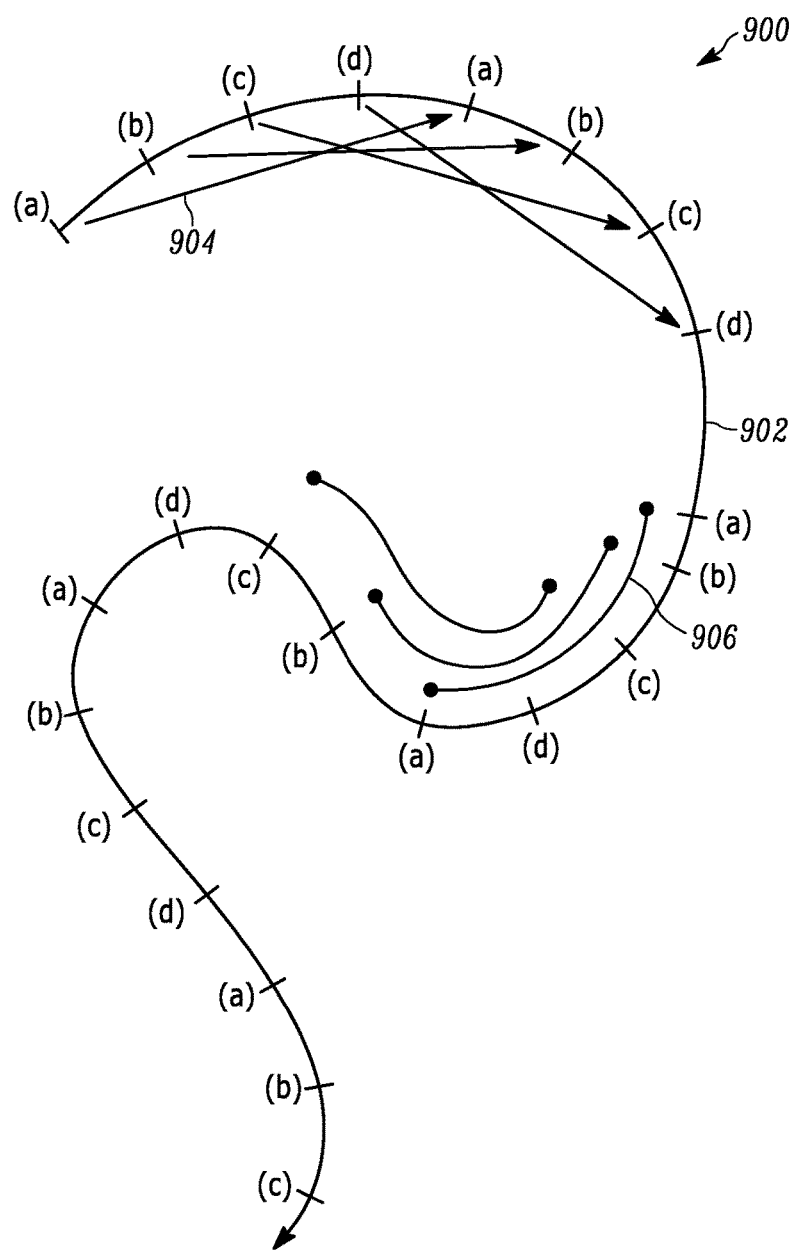
FIG. 9 is a view of an exemplary point spread function, which can be used to define a motion of an image sensor.

FIG. 9 illustrates a view 900 of an exemplary point spread function 902, which can be used to define a motion of an image sensor. The determined point spread function 902 can be used to estimate an overall motion of the detected image. In turn the motion estimate could be used as part of image modifying module to produce a processed image that mitigates potentially undesired aspects associated with the use of different exposure times. In some instances, it may be beneficial to derive a motion vector that does not exactly match the point spread function 902, or uses a different sub-section of the point spread function. For example, because the data associated with different portions of the first sub-group may be accessed at different times along the length of the point spread function 902, it may be beneficial to use a different portion of the point spread function 902 for different sections of the first sub-group, when modifying the image derived from the data values read.

The illustrated embodiment highlights an example where it may take the time period of four larger blocks 702 to access the data associated with all of the image sensors of the first sub-group of image sensors. As such points (a) corresponds to the determined position of the feature point immediately after a first quarter of the data from the first sub-group of sensors is accessed. Points (b), (c) and (d), correspond to a different determined position of the feature point associated with a different quartile of the data accessed from the first sub-group. Correspondingly, where one is registering and combining to de-noise, one might use an (a)-to-(a) 904 vector to define the offset for a first portion of the image, but one might use a different (b)-to-(b) vector to define the offset for a different portion of the image. It is further possible that one could interpolate a vector to further define an estimated movement for a particular section of the sub-group between sequential images.

While it may be desirable to skip points along the length of the point spread function for determining an estimated motion for purposes of de-noising, different overlapping sections of the point spread function could be used for de-blurring with different portions of the image associated with the first sub-group of sensor cells. Where different sections of the point spread function 902 will correspond to different time periods during which the sensor data was allowed to accumulate in the corresponding sensor cells between sequential read outs of the data for each of different sections of the image. For example, the tracked motion from (a)-to-(a) 906 could be used for de-blurring a particular corresponding portion of the image derived from the first sub-group having the lower sampling rate. Correspondingly, different portions of the overall image associated with points (b), (c) and (d) could use a different overlapping portion of the point spread function 902, which better corresponds to the time period over which the sensor data was allowed to accumulate.

Furthermore, it may be desirable to combine image portions that have been de-blurred with image portions that have been de-noised. For example, it may be desirable to de-blur the portions of the image associated with the first sub-group of sensor cells (lower sampling rate portions), and combine them with de-noised portions of the image associated with the second sub-group of sensor (higher sampling rate portions). In such an instance, the determined point spread function could be used to support both types of modification of the image data.

Figure 10:
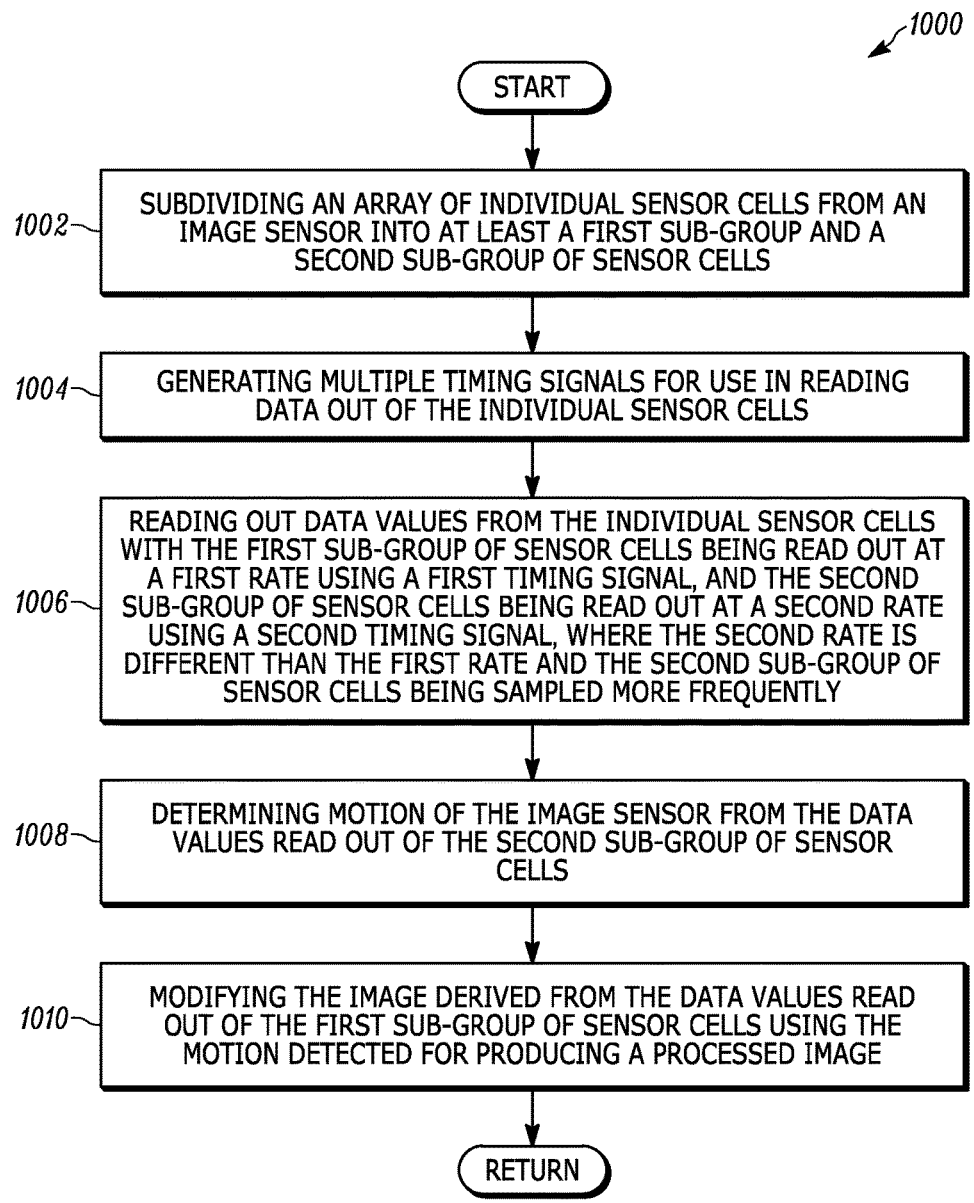
FIG. 10 is a flow diagram of a method for compensating for motion in an image received by an image sensor.

FIG. 10 illustrates a flow diagram of a method 1000 for compensating for motion in an image received by an image sensor. The method includes sub-dividing 1002 an array of individual sensor cells from an image sensor adapted for receiving an image into at least a first sub-group and a second sub-group of sensor cells. Multiple timing signals are then generated 1004 for use in reading data out of the individual sensor cells of the image sensor. Data values are then read out 1006 from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal. The second rate is different than the first rate, where the sensor cells in the second sub-group of sensor cells are sampled more frequently than the sensor cells in the first sub-group of sensor cells. Motion of the image sensor is then determined 1008 from the data values read out of the individual sensor cells of the second sub-group of sensor cells. The image derived from the data values read out of the individual sensor cells of the first sub-group of sensor cells is then modified 1010 using the motion detected for producing a processed image.

Figure 11:
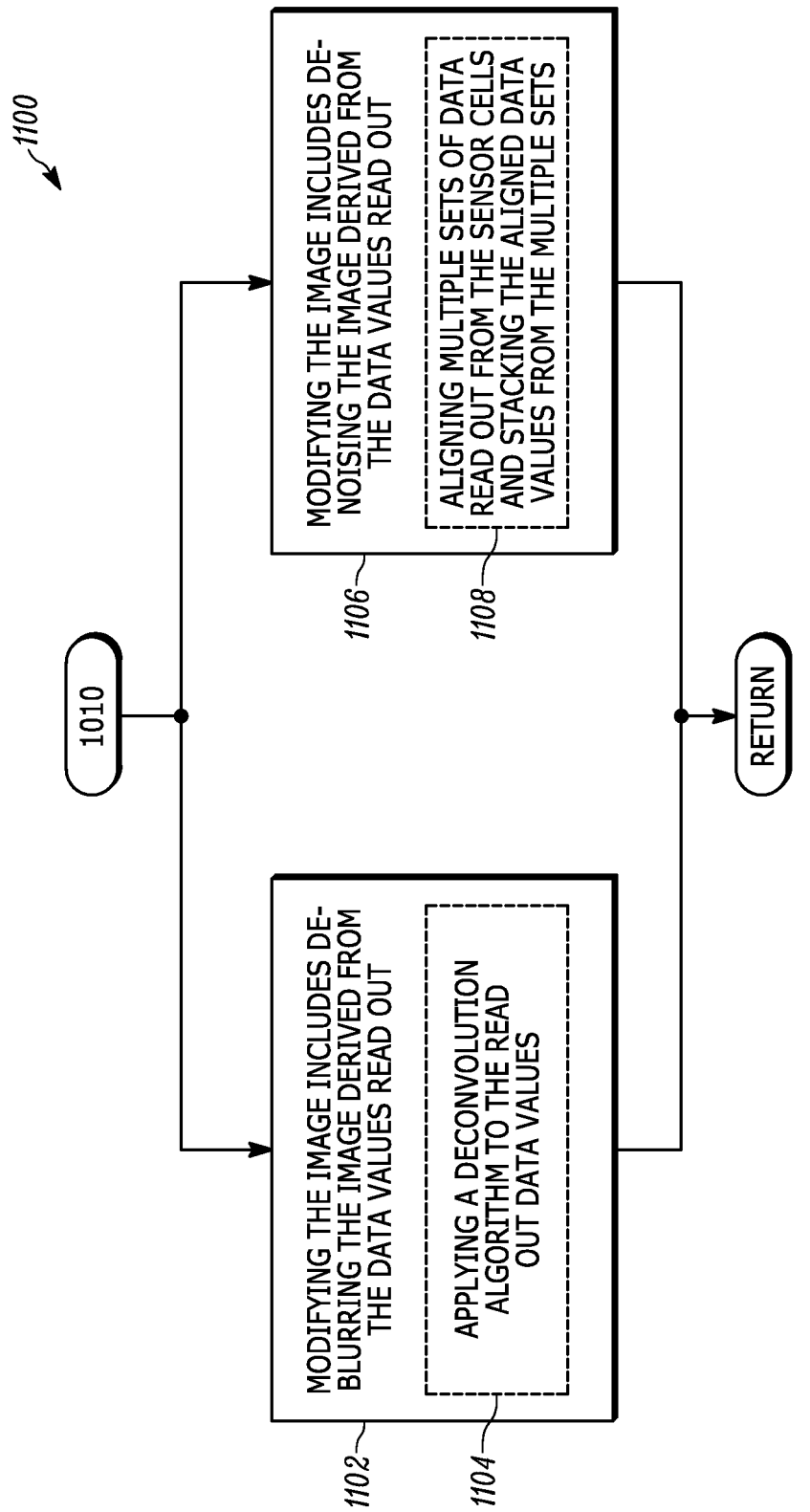
FIG. 11 is a more detailed flow diagram associated with one or more embodiments for modifying an image derived from the data values read out of the individual sensor cells.

FIG. 11 illustrates a more detailed flow diagram 1100 associated with one or more embodiments for modifying an image derived from the data values read out of the individual sensor cells. The more detailed flow diagram 1100 involving modifying 1010 an image derived from the data values read out of the individual sensor cells can include one or both of de-blurring 1102 the image derived from the data values read out or de-noising 1106 the image derived from the data values read out. Where the modifying 1010 of an image includes de-blurring, the de-blurring can include applying 1104 a deconvolution algorithm to the read out data values. Where the modifying 1010 of an image includes de-noising, the de-noising can include aligning multiple sets of data read out from the sensor cells and stacking the aligned data values from the multiple sets 1108.

While the particular embodiments noted throughout involve de-blurring and de-noising, one skilled in the art will recognize that subdividing an array of individual sensor cells from an image sensor, and use of a higher rate of sampling to identify a more precise point spread function relative to one of the sub-divided groups can be beneficially used with other forms of modifying an image where it is beneficial to determine and compensate for motion in an image received by an image sensor without departing from the teachings of the present application.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An image processing circuit comprising:
   an image sensor adapted for receiving an image including an array of individual sensor cells, the array including a plurality of sensor cells divided into at least a first sub-group and a second sub-group, each sub-group including a different plurality of sensor cells; and
   a controller coupled to the image sensor, the controller including:
      a timing signal generator module adapted for generating multiple timing signals for use in reading data out of the individual sensor cells of the image sensor;
      an image sensor interface module coupled to the timing signal generator module for receiving timing signals used in reading out data values from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal, the second rate being different than the first rate, where the sensor cells in the second sub-group of sensor cells are sampled more frequently than the sensor cells in the first sub-group of sensor cells;
      a motion detection module adapted for determining motion of the image sensor from the data values read out of the individual sensor cells of the second sub-group of sensor cells; and
      an image modifying module adapted for modifying the image derived from the data values read out of the individual sensor cells of the first sub-group of sensor cells using the motion detected by the motion detection module for producing a processed image; and
   wherein the array of individual sensor cells in addition to the first sub-group and the second sub-group are further subdivided into a third sub-group, and the data values from the individual sensor cells of the third sub-group of sensor cells are read out by the image sensor interface module at a third rate using a third timing signal, where the sensor cells in the third sub-group of sensor cells are sampled more frequently than the sensor cells in the first sub-group of sensor cells, and wherein a localized motion of the image sensor from the data values read out of the individual sensor cells of the third sub-group of sensor cells is determined by the motion detection module.

2. An image processing circuit in accordance with claim 1, wherein the image modifying module is adapted for de-blurring the image derived from data values read out of the individual sensor cells of the first sub-group of sensor cells using the motion determined by the motion detection module for producing a processed image.

3. An image processing circuit in accordance with claim 2, wherein the image modifying module includes a deconvolution module.

4. An image processing circuit in accordance with claim 1, wherein the image modifying module is adapted for de-noising the image derived from data values read out of the individual sensor cells of the first sub-group of sensor cells using the motion determined by the motion detection module for producing a processed image.

5. An image processing circuit in accordance with claim 4, wherein the image modifying module includes an image registration and stacking module.

6. An image processing circuit in accordance with claim 1, wherein the array of individual sensors is arranged in a plurality of rows and a plurality of columns.

7. An image processing circuit in accordance with claim 6, wherein the second sub-group includes a plurality of individual sensor cells, which are adjacent, from one or more preselected rows, wherein multiple sequential read out of data values from the individual adjacent sensor cells in a particular one of the one or more preselected rows can be used to detect motion of the image sensor in a direction along the length of the particular one of the one or more preselected rows.

8. An image processing circuit in accordance with claim 6, wherein the second sub-group includes a plurality of individual sensor cells, which are adjacent and span a plurality of preselected adjacent rows, wherein multiple sequential read out of data values from the individual adjacent sensor cells across the plurality of preselected adjacent rows can be used to detect motion of the image sensor in a direction across the plurality of the preselected adjacent rows.

9. An image processing circuit in accordance with claim 1, wherein the second rate is substantially the same as the third rate, and the second timing signal is substantially the same as the third timing signal.

10. An image processing circuit comprising:
    an image sensor adapted for receiving an image including an array of individual sensor cells, the array including a plurality of sensor cells divided into at least a first sub-group and a second sub-group, each sub-group including a different plurality of sensor cells; and
    a controller coupled to the image sensor, the controller including:
       a timing signal generator module adapted for generating multiple timing signals for use in reading data out of the individual sensor cells of the image sensor;
       an image sensor interface module coupled to the timing signal generator module for receiving timing signals used in reading out data values from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal, the second rate being different than the first rate, where the sensor cells in the second sub-group of sensor cells are sampled more frequently than the sensor cells in the first sub-group of sensor cells;
       a motion detection module adapted for determining motion of the image sensor from the data values read out of the individual sensor cells of the second sub-group of sensor cells; and
       an image modifying module adapted for modifying the image derived from the data values read out of the individual sensor cells of the first sub-group of sensor cells using the motion detected by the motion detection module for producing a processed image; and wherein the motion detection module uses non-adjacent points along the determined motion to determine a localized motion, which coincides with when the data is read out of a respective portion of the first sub-group of sensor cells for use with modifying by the image modifying module of a respective portion of the image associated with data from the respective portion of the first sub-group of sensor cells.

11. An image processing circuit in accordance with claim 10, wherein a different localized motion from a different set of non-adjacent points along the determined motion are used by the image modifying module for modifying different respective portions of the image.

12. A method for compensating for motion in an image received by an image sensor, the method comprising:
sub-dividing an array of individual sensor cells from an image sensor adapted for receiving an image into at least a first sub-group, a second sub-group, and a third sub-group of sensor cells;
generating multiple timing signals for use in reading data out of the individual sensor cells of the image sensor;
reading out data values from the individual sensor cells, wherein the data values from the individual sensor cells of the first sub-group of sensor cells are read out at a first rate using a first timing signal, the data values from the individual sensor cells of the second sub-group of sensor cells are read out at a second rate using a second timing signal, the second rate being different than the first rate, where the sensor cells in the second sub-group of sensor cells are sampled more frequently than the sensor cells in the first sub-group of sensor cells, and the data values from the individual sensor cells of the third sub-group of sensor cells are read out at a third rate using a third timing signal, the third rate being different than the first rate, where the sensor cells in the third sub-group of sensor cells are sampled more frequently than the sensor cells in the first sub-group of sensor cells;
determining motion of the image sensor from the data values read out of the individual sensor cells of the second sub-group of sensor cells, and wherein a localized motion of the image sensor from the data values read out of the individual sensor cells of the third sub-group of sensor cells is determined; and
modifying the image derived from the data values read out of the individual sensor cells of the first sub-group of sensor cells using the motion detected for producing a processed image.

13. A method in accordance with claim 12, wherein modifying the image includes de-blurring the image derived from the data values read out of the individual sensor cells of the first sub-group of sensor cells using the motion determined from the data values read out of the individual sensor cells of the second sub-group of sensor cells.

14. A method in accordance with claim 13, wherein de-blurring the image derived from the data values read out of the individual sensor cells of the first sub-group of sensor cells includes applying a deconvolution algorithm using the motion determined from the data values read out of the individual sensor cells of the second sub-group.

15. A method in accordance with claim 12, wherein modifying the image includes de-noising the image derived from the data values read out of the individual sensor cells of the first sub-group of sensor cells using the motion determined from the data values read out of the individual sensor cells of the second sub-group of sensor cells.

16. A method in accordance with claim 15, wherein de-noising the image derived from the data values read out of the individual sensor cells of the first sub-group of sensor cells includes aligning multiple sets of data read out from the first sub-group of sensor cells using the motion determined from the data values read out of the individual sensor cells of the second sub-group, and stacking the aligned data values from the multiple sets.

17. A method in accordance with claim 12, wherein the array of individual sensors is arranged in a plurality of rows and a plurality of columns, and wherein the second sub-group includes a plurality of individual sensor cells, which are adjacent.

18. A hand-held electronic device comprising:
a housing adapted for being held by the hand of the user;
an image sensor coupled to the housing including being at least one of located on or located within the housing, the image sensor being adapted for receiving an image, and including an array of individual sensor cells, the array including a plurality of sensor cells divided into at least a first sub-group and a second sub-group, each sub-group including a different plurality of sensor cells; and
a controller coupled to the image sensor, the controller including:
a timing signal generator module adapted for generating multiple timing signals for use in reading data out of the individual sensor cells of the image sensor;
an image sensor interface module coupled to the timing signal generator module for receiving timing signals used in reading out data values from the individual sensor cells, wherein the data values from the individual sensor cells of the first sub-group of sensor cells are read out at a first rate using a first timing signal, and the data values from the individual sensor cells of the second sub-group of sensor cells are read out at a second rate using a second timing signal, the second rate being different than the first rate, where the sensor cells in the second sub-group of sensor cells are sampled more frequently than the sensor cells in the first sub-group of sensor cells;
a motion detection module adapted for determining motion of the image sensor from the data values read out of the individual sensor cells of the second sub-group of sensor cells; and
an image modifying module adapted for modifying the image derived from the data values read out of the individual sensor cells of the first sub-group of sensor cells using the motion detected by the motion detection module for producing a processed image; and wherein the array of individual sensor cells in addition to the first sub-group and the second sub-group are further subdivided into a third sub-group, and the data values from the individual sensor cells of the third sub-group of sensor cells are read out by the image sensor interface module at a third rate using a third timing signal, where the sensor cells in the third sub-group of sensor cells are sampled more frequently than the sensor cells in the first sub-group of sensor cells, and wherein a localized motion of the image sensor from the data values read out of the individual sensor cells of the third sub-group of sensor cells is determined by the motion detection module.

19. A hand-held electronic device in accordance with claim 18, wherein the motion detected by the motion detection module includes hand jitter while the hand-held electronic device is being held by the hand of the user.

* * * * *